United States Patent [19]
Moscovitch et al.

[11] Patent Number: 5,572,028
[45] Date of Patent: Nov. 5, 1996

[54] MULTI-ELEMENT DOSIMETRY SYSTEM USING NEURAL NETWORK

[75] Inventors: Marko Moscovitch, Potomac, Md.; Joseph E. Rotunda, Cuyahoga Falls, Ohio

[73] Assignee: Saint-Gobain/Norton Industrial Ceramics Corporation, Worcester, Mass.

[21] Appl. No.: 326,606

[22] Filed: Oct. 20, 1994

[51] Int. Cl.$^6$ .................................................. G01T 1/11
[52] U.S. Cl. ................................ 250/337; 250/486.1
[58] Field of Search ........................... 250/337, 486.1; 395/924

[56] References Cited

U.S. PATENT DOCUMENTS 3,176,133  3/1965  McCall et al. ........................... 250/337

OTHER PUBLICATIONS

Pia et al., Med. Phys. 10(4), Jul./Aug. 1983, "A computerized TLD system", 1983, pp. 462466.
Simpson, Artificial Neural Networks, 1990, pp. 100–135.

Primary Examiner—David P. Porta
Assistant Examiner—David Vernon Bruce
Attorney, Agent, or Firm—Volker R. Ulbrich; Don W. Bulson

[57] ABSTRACT

A dosimetry system and method characterized by use a plurality of radiation sensitive elements to monitor exposure to a radiation field composed of one or more types of radiation at one or more different energies; reading the radiation sensitive elements in a reader after irradiation by the radiation field to obtain element outputs; and supplying the element outputs to a trained neural network computer apparatus wherein the element outputs are analyzed to provide an output indicative of the radiation field.

23 Claims, 4 Drawing Sheets

MULTI-ELEMENT DOSIMETRY SYSTEM USING NEURAL NETWORK

The invention herein described relates generally to radiation dosimetry and, more particularly, to a multi-element dosimeter and associated dosimetry method that allows precise dose measurements even in mixed radiation field situations.

BACKGROUND

Considerable interest has been generated in recent years in the development of multi-element thermoluminescent dosimeters and the associated dose calculation algorithms, especially as applied to large scale routine personnel dosimetry. Many facilities in the United States must comply with accreditation programs such as the Department of Energy Laboratory Accreditation Program (DOELAP), or the National Voluntary Accreditation Program (NVLAP). Prior dosimeters and associated algorithms have experienced difficulties in meeting the criteria set for low energy photons or mixtures of low energy photons with beta particles and/or neutrons.

U.S. Pat. No. 5,065,031 discloses a multi-element TL dosimeter together with a dose calculation method which are designed to enable users to meet the ever growing demands of modern personnel dosimetry and also environmental monitoring. The therein described methodology provides for improved interpretation of dosimeter response in terms of risk related quantity, i.e., dose equivalent. The dosimeter and method are capable of identifying the mixture type in a variety of mixed fields and estimating the relative contribution of major components. The dosimeter and dose calculation method enable a personnel dosimetry system to accommodate a wide range of radiation types and energies.

More particularly, the dosimeter described in the aforesaid patent is composed of two parts, namely a TLD card and a holder. The TLD card includes multiple thermoluminescent (TL) elements and the holder includes associated radiation modifying filters. Four TL elements and associated filters function as a basis for shallow dose measurement, a basis for deep dose measurement, for eye dose measurement, and as an energy spectrometer for low level energy photons, respectively. The dosimeter may include one or more other TL elements and associated filters for other purposes such as neutron dose estimation. Element Correction Coefficients (ECCs) are generated to relate the TL efficiency of each TL element of an entire dosimeter population (field dosimeters) to the mean TL efficiency of a small subset of this population which is used only for calibration purposes (calibration dosimeters). When an ECC is applied to the response of each individual TL element of any dosimeter, its TL efficiency is virtually identical to the mean value of the calibration dosimeters group.

As disclosed in the aforesaid patent, dosimeter response can be used to identify the radiation field mixture composed of beta particles and/or photons and to determine the relative contribution of each component in the mixed radiation field. This is accomplished by the use of mixture identification formulas that are based on superposition of radiation fields and the algorithmization of the response correlation between two pairs of TL element response ratios. Mixture identification curves (characterizations) are obtained and these are very different for various radiation field mixtures and compositions, thereby enabling identification of mixture type and component contribution. In U.S. Pat. No. 5,004,921 the methodology of the aforesaid application is expanded by providing for accurate interpretation of the dosimeter reading in terms of risk related quantity for neutron fields and mixtures thereof with photon and/or beta fields.

The foregoing and other conventional techniques have in the past relied upon development of algorithms and empirical data for interpretation of dosimeter data. Hence, the accuracy of such systems is dependent on the validity of the algorithms being used.

SUMMARY OF THE INVENTION

The present invention provides an entirely new approach to interpretation of dosimeter data. This new approach is based on use of an artificial neural network to interpret dosimeter response, data and provide accurate radiation information such as deep dose, shallow dose, radiation energy, mixed radiation field components, eye dose, etc. The approach is generally applicable to any multi-element dosimeter and read-out system, including not only thermoluminescent dosimeters but also other types of dosimeters such as electronic dosimeters that incorporate multiple radiation sensitive elements.

More particularly, a dosimetry system and method according to the invention are characterized by use a plurality of radiation sensitive elements to monitor exposure to a radiation field composed of one or more types of radiation at one or more different energies; reading the radiation sensitive elements in a reader after irradiation by the radiation field to obtain element outputs; and supplying the element outputs to a trained neural network computer apparatus wherein the element outputs (or functions thereof) are used as inputs to provide an output indicative of a characteristic of the radiation field.

In a preferred system and method, the neural computer network is composed of at least two layers of nodes connected by a plurality of links each having associated therewith a weighting coefficient. The input nodes may be functionally linked to a succeeding layer of the neural network as by logarithmic functions. Also, the element outputs may be supplied to the trained neural network as ratios of one another. The output of the neural network may be a correction factor that may be applied to a selected one of the element outputs to obtain a value for a respective dose category such as deep dose, shallow dose, eye dose, photon or beta component, etc. The neural network may be trained by using a computer implemented learning algorithm supplied with a plurality of input-output pairs to obtain the weighting coefficients. In use, inputs outside the limits of the training set preferably are limited to the limits of the training set to prevent the neural network from becoming unstable. Moreover, the output of the neural network may be supplied to an output device such as a printer, display, memory storage device, etc.

According to another aspect of the invention, there is provided a method of developing a dosimetry system for extracting radiation field information from a plurality of radiation sensitive elements used to monitor exposure to a radiation field composed of one or more types of radiation at one or more different energies, comprising the steps of selecting an architecture for a neural computer network composed of at least two layers of nodes connected by a plurality of links each having associated therewith a weighting coefficient; and training the neural network by using a computer implemented learning algorithm supplied with a plurality of input-output pairs to obtain the weighting coefficients.

The foregoing and other features are hereinafter described and particularly pointed out in the claims, the following description and the annexed drawings setting forth in detail illustrative embodiments of the invention, these being indicative, however, of but a few of the various ways in which the principles of the invention may be employed.

DETAILED DESCRIPTION

Figure 1:
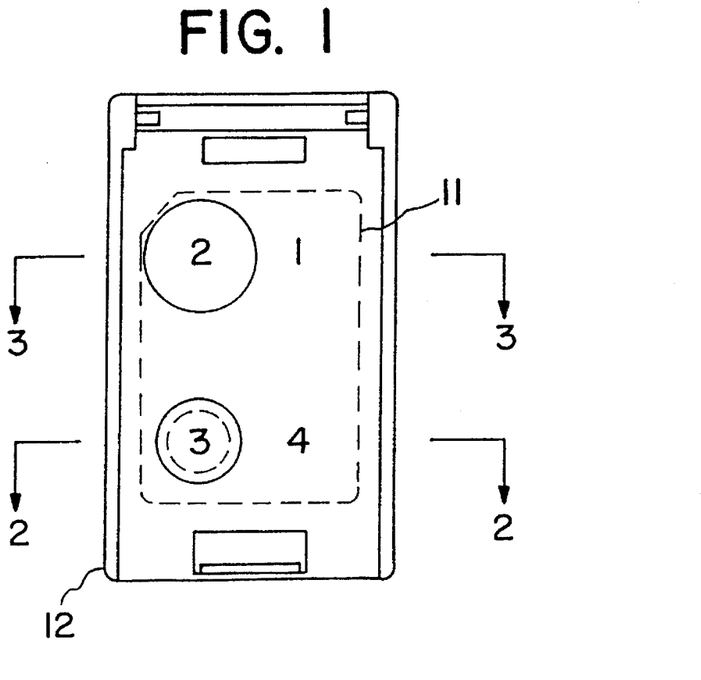
FIG. 1 is a plan view of an exemplary multi-element beta-gamma dosimeter having preferred usage in the practice of the invention.
Figure 2:
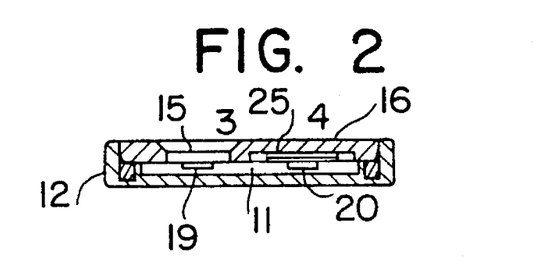
FIG. 2 is a sectional view of the dosimeter taken along the line 2—2 of FIG. 1.
Figure 3:
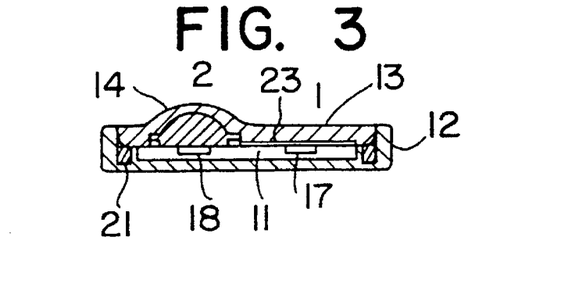
FIG. 3 is a sectional view of the dosimeter taken along the line 3—3 of FIG. 1.

In FIGS. 1-3, a dosimeter 10 can be seen to be principally composed of two parts, a thermoluminescence dosimetry (TLD) card 11 and a holder 12 which carries radiation modifying filters 13-16. The TLD card 11 consists of four LiF:Mg,Ti thermoluminescence (TL) elements 17-20 of different thicknesses and compositions mounted in known manner between two Teflon® polytetrafluoroethylene (PTFE) sheets on an aluminum substrate. Each TL element is covered by its own unique filter which provides different radiation absorption thicknesses to allow dose estimation for various organs in risk. The TL elements 17-20 are located in positions designated 1-4, respectively, and the card 11 may be sealed in the holder 12 by annular seal 21.

The illustrated dosimeter is an 8825 Dosimeter (the details of which are incorporated herein by reference) sold by Harshaw/Bicron Radiation Measurement Products, Solon, Ohio. The TL element 19 in position 3 is a thin solid TLD-700 phosphor (Lithium-7 enriched fluoride) having a preferred thickness of 0.006 inch. This element is protected from the environment by filter 15 which is a thin aluminized Mylar® sheet having a preferred thickness of 0.0015 inch and a density thickness of 17 mg/cm$^2$. The thin aluminized Mylar® sheet corresponds to an open window in the holder. The response of element 19 provides a basis for shallow dose estimation. As a result of the small thickness of element 19, underestimation of shallow dose contribution of low energy beta rays is reduced. The small thickness of both the element and filter provide for reduced energy dependent response to low energy beta particles.

TL elements 17, 18 and 20 in positions 1, 2 and 4, respectively, each are a thicker TLD-700 phosphor having a preferred thickness of 0.015 inch. Element 18 is covered by filter 14 to provide a basis for deep dose estimation. The filter 14 has a density thickness substantially greater than 250 mg/cm$^2$ and preferably 1000 mg/cm$^2$ (0.040 inch thick ABS and 0.162 inch thick PTFE) to minimize the contribution of high energy beta rays ($^{90}$Sr/$^{90}$Y) to the deep dose response and to provide tissue equivalent absorption thickness as close as possible to the actual depth in tissue where deep dose estimation is desired. This results in smaller correction factors to be applied to the response of the TL element in position 2 when the deep dose index is estimated.

Element 17 is covered by filter 13 including a copper filter element 23, as illustrated. The variation with energy of the photon attenuation characteristics of the copper filter element 23 located in position 1 gives the dosimeter the ability to act as an energy spectrometer for low energy photons. The filter 13 covering the element 17 is composed of 0.091 inch ABS plastic having a density thickness of 240 mg/cm$^2$ and 0.004 inch thick copper having a density thickness of 91 mg/cm$^2$.

TL element 20 in position 4 is covered by 0.091 thick ABS plastic having a density thickness of 240 mg/cm$^2$ and a 0.004 inch thick tin filter element 25 having a density thickness of 463 mg/cm$^2$. The variation with energy of the photon attenuation characteristics of the tin filter element located in position 4 gives the dosimeter the ability to act as an energy spectrometer for intermediate energy photons.

As in conventional personnel dosimetry systems, the dosimeters are worn by personnel so that the dosimeters will be exposed to the same amount and type of radiation. On a periodic basis such as daily the dosimeters are read by a TLD card reader, such as a Model 8800 or Model 6600 automatic TLD card reader sold by Harshaw/Bicron Radiation Measurement Products, Solon, Ohio. These TLD card readers utilize a non-contact heating technique based on pre-purified hot nitrogen gas or air. Both employ a programmable, precisely controlled linear time temperature profile for reproducible heating of the dosimeter elements. This is desirable because the amount of radiation induced TL is dependent on the thermal history of the material as well as on the heating rate during readout. A fully controlled heating cycle is therefore important especially for low dose measurements. Reference may be had to U.S. Pat. Nos. 4,727,253 and 4,835,388 for further reader details, which patents are hereby incorporated herein by reference. However, other types of readers may be employed such as planchet-based readers, for example, Harshaw/Bicron Model 4000 reader.

For the most part TL elements can not all be manufactured to have exactly the same TL efficiency [TL efficiency (TLE) is defined as the emitted TL light intensity per unit of absorbed dose]. In view of this, individual element correction coefficients (ECC's) preferably are defined, developed and applied.

A batch of TL elements typically has variation in TL efficiencies of 10–15% (one relative standard deviation). This spread can be virtually reduced to 1–2% if ECC's are applied. Generation of ECC's is based on relating the TL efficiency of each TL element of the entire dosimeter population, i.e., the field dosimeters, to the mean TL efficiency of a small subset of this population which is used only for calibration purposes, i.e., calibration dosimeters. When the ECC is applied to the response of each individual TL element of any of the field or calibration dosimeters, its TL efficiency is virtually identical to the mean value of the calibration dosimeters group and as a result all the TL elements have ideally the same TL efficiency. For a further discussion of the general concept of element correction coefficients, reference may be had to Moscovitch, M., Chamberlain, J. and Velbeck, K. J., "Dose Determination Algorithm for a Nearly Tissue-equivalent Multi-element Thermoluminescent Dosimeter", Proc. 2nd Conf. on Radiation Protection and Dosimetry, Orlando, Fla. ORNL/TM-1097, pp. 48–59 (1988).

Figure 4:
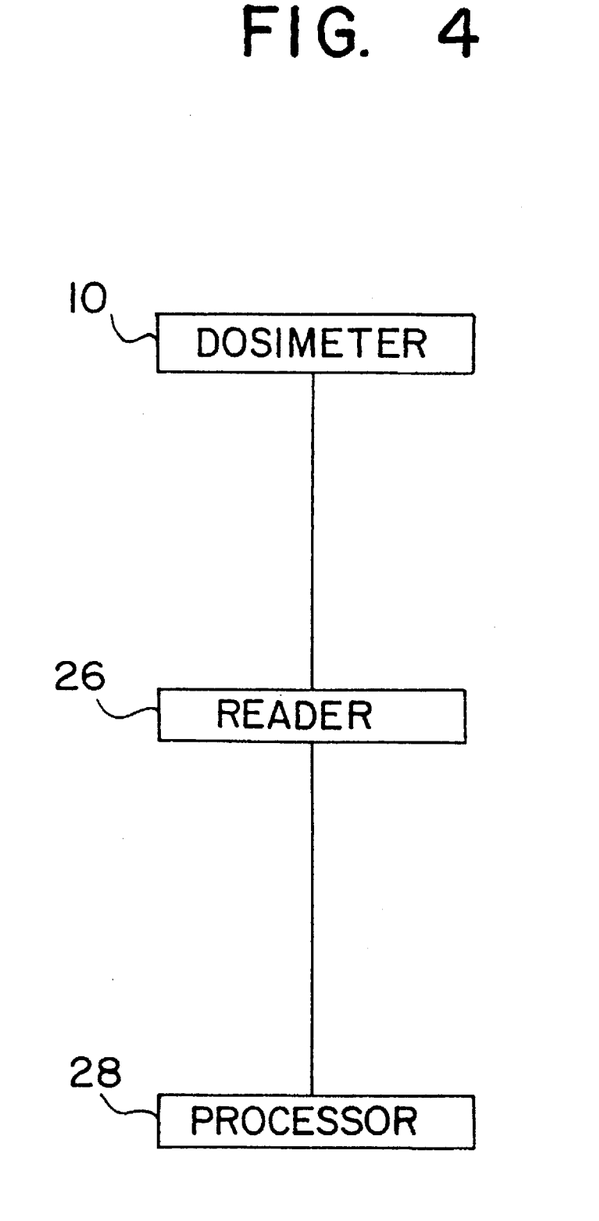
FIG. 4 is a diagrammatic illustration of a dosimetry system according to the present invention.

The reader reads each TL element to obtain an element output which in this exemplary case is the TL response, i.e., TL light intensity. The element outputs of the TL elements are supplied to a processor such as a digital computer conventionally programmed to function as a neural network in the hereinafter described manner. The fundamental components of this exemplary dosimetry system according to the invention are illustrated in FIG. 4, such components comprising one or more dosimeters 10, a reader 26 and a processor 28 for implementing a neural network in accordance with the invention.

Neural networks are information processors inspired by the biological nervous system. They are computer-based simulation of living neurons (a nerve cell with all of its processes), which work fundamentally different than conventional computing. Conventional computer programs follow exactly a specific predetermined pattern of logical and mathematical instructions (algorithms). This means that for the same input the result of a conventional computer program will always be the same. In contrast, a neural network has the capability to learn from its own experience. The computer is shown many times what the solutions to certain types of problems look like, and the network essentially comes up with its own solution to similar, but not exactly the same, problems.

Neural networks have been proven to be particularly useful for pattern recognition applications. Boone J. M., Sigillito V. G., and Shaber S. G., "Neural networks in radiology: An introduction and evaluation in signal detection task", Med. Phys. 17, 234–241 (1990).

Figure 5:
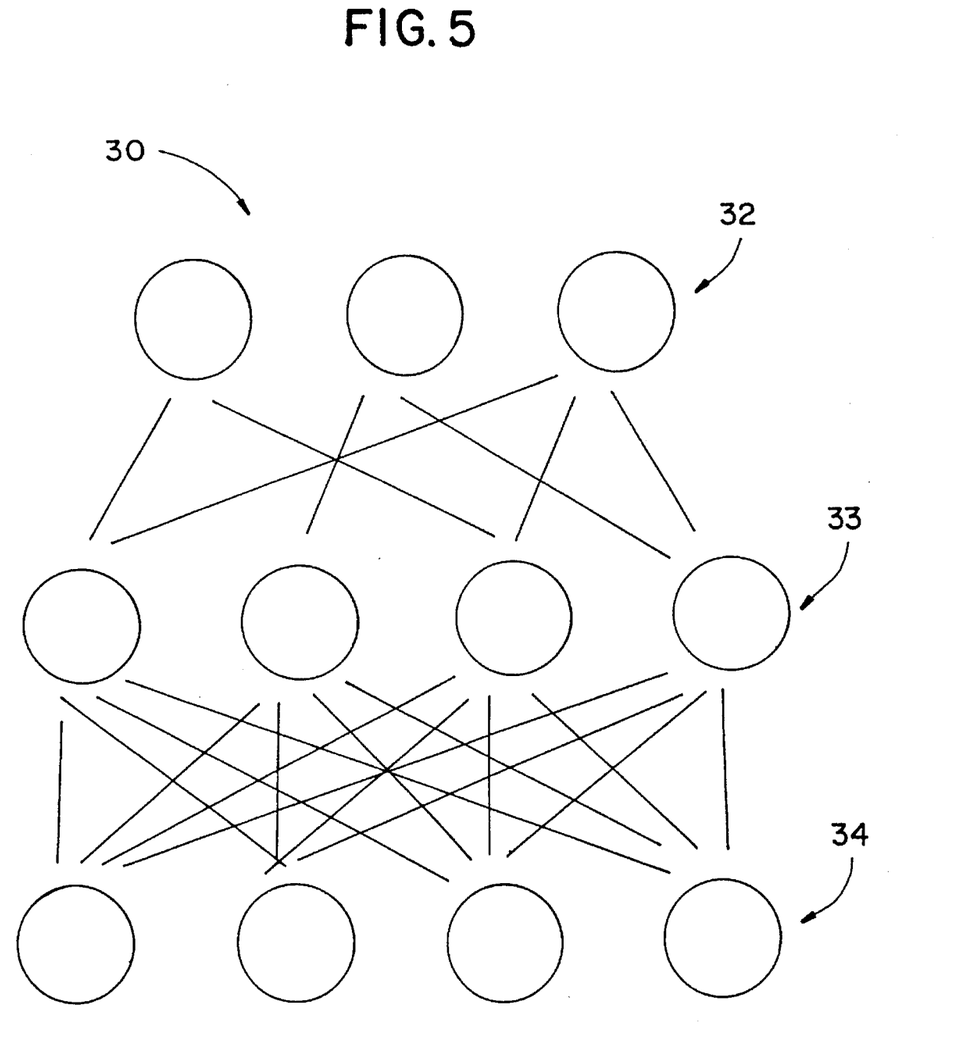
FIG. 5 is a representation of a neural network useful in carrying out the present invention.

A typical neural network is designated generally by reference numeral 30 in FIG. 5. The basic building block is a node (artificial neuron or processing element), represented by the circles. As illustrated, the network typically consists of an input-layer of processing elements 32, an output-layer of processing elements 33, and one or more hidden-layers of processing elements 34. The network can be fully connected where all possible links are used, or only partially connected. Each link between the processing elements, shown as straight lines, carries a particular weight. The intelligence of the network resides in the values of these weights. In an asynchronous fashion, each processing element computes the sum of products of the weight of each input line multiplied by the signal level on that input line. If the sum of products exceeds a preset activation threshold, the output of the processing element typically is computed using a nonlinear function (sigmoid, for example). Learning is achieved through adjustment of the values of the weights. The value of weights are determined by presenting the network with "training material" in the form of a variety of input/output data pairs. During successive iterations through the training set, the weights are being continuously updated by a learning algorithm until the network learns to associate between the input (the TL element data) and the appropriate output (the appropriate dose components).

Several important features of neural architectures distinguish them from prior art approaches.

1. There is little or no executive function. There are only very simple units each performing its sum of products calculation. Each processing element's task is thus limited to receiving the inputs from its neighbors and, as a function of these inputs, computing an output value which it sends to its neighbors. Each processing element performs this calculation periodically, in parallel with, but not synchronized to, the activities of any of its neighbors.

2. All knowledge is in the connections. Only very short term storage can occur in the states of the processing elements. All long term storage is represented by the values of the connection strengths or "weights" between the processing elements. It is the rules that establish these weights and modify them for learning that primarily distinguish one neural network model from another. All knowledge is thus implicitly represented in the strengths of the connection weights rather than explicitly represented in the states of the processing elements.

3. In contrast to algorithmic computers and expert systems, the goal of neural net learning is not the formulation of an algorithm or a set of explicit rules. During learning, a neural network self-organizes to establish the global set of weights which will result in its output for a given input most closely corresponding to what it is told is the correct output for that input. It is this adaptive acquisition of connection strengths that allows a neural network to behave as if it knew the rules. Conventional computers excel in applications where the knowledge can be readily represented in an explicit algorithm or an explicit and complete set of rules. Where this is not the case, conventional computers encounter great difficulty. While conventional computers can execute an algorithm much more rapidly than any human, they are challenged to match human performance in non-algorithmic tasks such as pattern recognition, nearest neighbor classification, and arriving at the optimum solution when faced with multiple simultaneous constraints. If N exemplar patterns are to be searched in order to classify an unknown input pattern, an algorithmic system can accomplish this task in approximately order N time. In a neural network, all of the candidate signatures are simultaneously represented by the global set of connection weights of the entire system. A neural network thus automatically arrives at the nearest neighbor to the ambiguous input in order 1 time as opposed to order N time.

Training of the neural network may be done in various ways including, in particular, the back-propagation technique, which is described in Clark, J. W., "Neural network modeling", Phys. Med. Biol., 36, 1259–1317 (1991), and Rumelhart, David E. and McClelland, James L., "Parallel Distributed Processing", MIT Press, 1986, Volume 1, both of which are hereby incorporated herein by reference. During neural network training, errors (i.e., the difference between the appropriate output for an exemplar input and the current net output for that output) are propagated backwards from the output layer to the middle layer (or layers) and then to the input layer. These errors are utilized at each layer by the training algorithm to readjust the interconnection weights so that a future presentation of the exemplar pattern will result in the appropriate output category. The back-propagation learning algorithm is based on least squares minimization of the network error defined as the difference between the actual output and the desired output.

In the present application of a neural network the input of the training pairs, in general, are the outputs from the radiation sensitive elements of the dosimeter and the outputs are the radiation dose information sought to be extracted from the dosimeters. More particularly and by example, the input of the training pairs may be the TL signal of the TL elements L1, L2, L3 and L4, or ratios thereof, and the outputs may be the deep dose, shallow dose, and eye dose, or correction factors to be applied to respective responses of the TL elements to obtain deep, shallow and eye dose, as well as other characteristics of the radiation field to which the dosimeter elements were exposed, such as the gamma and beta components of the field.

In the instant example, the input/output training sets are generated by exposing the dosimeter to a variety of energies as well as field mixtures (relative contribution of each component field). Increasing the variability of the type of exposures in the training set improves the learning process and usually results in a "smarter" network, leading to a better and more accurate dose algorithm. During the training process, the TL signals as measured by the TLD reader are provided to the input layer, and the desired output, the delivered dose as reported by the calibration laboratory is provided to the output layer of the network.

In the present exemplary case, the amount of information available as input to the network is limited. It consists of four values L1, L2, L3 and L4, that form three independent ratios. This small amount of input information limits the capability of the dose algorithm both in terms of accuracy as well as the variability of dose calculation problems that it can handle. A possible solution to this difficulty is to use the popular back-propagation network with multiple hidden layers and nonlinear output functions.

Alternatively, a functional link network (FLN) may be employed, which generally results in a simple network. Another alternative is to combine a FLN network with a back propagation method network.

Functional links are used to develop the FLN that is applied to develop a TLD dose algorithm for the dosimeter, in this case a Type 8825 Dosimeter. The functional link concept enables the increase of the dimensionality of the input space (the number of nodes in the input layer) and constructing a simple network without hidden layers.

The main difference between typical neural network architecture such as shown in FIG. 5 and a FLN architecture is as follows. In a typical network the input units distribute the input data unchanged to succeeding layers. The FLN on the other hand applies a transformation (one or more functions) to the input data before distributing it to succeeding layers. The functional link essentially produces multiple data elements from each single input element. In general, there are two functional link methods: (1) functional-expansion model and (2) outer product model. In the functional expansion model, the input elements are used as the argument of one or more functions. In the outer product model, the functional link is obtained by multiplying certain input elements together. In principle, it is possible to combine the two methods into a hybrid model where the functions are applied first and the results are then multiplied together. Alternatively, the input elements can first be multiplied and the results used as arguments to a function.

There presently is not known any systematic method (other than empirical) that can be applied to choose the exact functional form, the number of functions and the functional link model (functional-expansion vs. outer-product), etc. Different problems require selection of different network architecture. For the 8825 algorithm the network architecture shown at 40 in FIG. 6 produces excellent results in terms of the bias and the standard deviation.

Figure 6:
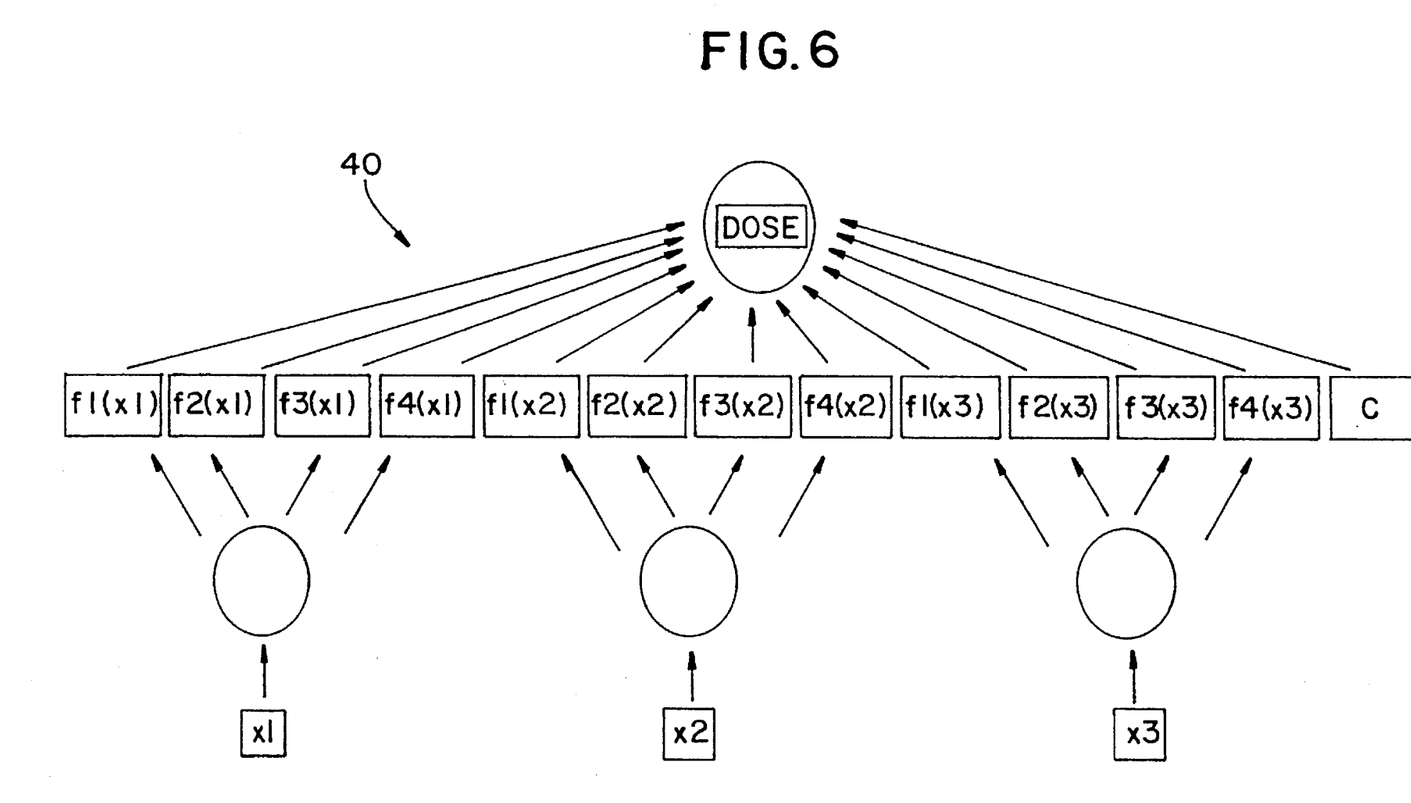
FIG. 6 is a representation of a functional link network useful in carrying out the present invention.

As illustrated, each of the three inputs (element ratios in this case) is passed through four functional links. In addition, there is a "true" node which is always "on" and the weight leading from this node provides a constant bias term. The functional link increases the dimensionality of the input space from 3 nodes to 13 nodes. The functions used in this network are as follows:

$X_1 = L1/L4$ $X_2 = L3/L2$ $X_3 = L3/L1$ and $f_1(x) = \log(x)$ $f_2(x) = (\log(x))^2$ $f_3(x) = (\log(x))^3$ $f_4(x) = (\log(x))^4$ The weights associated with the various links are $W_{11}$, $W_{21}, \ldots, W_{43}$. The correction or calibration value used to calculate the dose is given by:

$$r = W_{11}f_1(X_1) + W_{12}f_1(X_2) + W_{13}f_1(X_3) + W_{21}f_2(X_1) + \quad (1)$$
$$W_{22}f_2(X_2) + W_{23}f_2(X_3) + W_{31}f_3(X_1) + W_{32}f_3(X_2) +$$
$$W_{33}f_3(X_3) + W_{41}f_4(X_1) + W_{42}f_4(X_2) + W_{43}f_4(X_3) + C$$

This expression is hereinafter referred to as the weighting expression.

The weighting coefficients $W_{ij}$ of the weighting expression are obtained by applying a learning algorithm. Since the weighting expression is linear in these coefficients, i.e., it can be expressed as a linear combination of the logarithmic functions and their powers, a method of multiple regression is used to fit a function that is linear in the coefficients to a set of dosimetric TLD data (training set). An objective here is to provide a general dose algorithm development tool for development of neural network based dose algorithms for a wide variety of personal and other types of dosimeters.

The weighting expression can be written as a general linear function:

$$Y_i = \beta_0 + \beta_1 X_{i1} + \beta_2 X_{i2} + \ldots + \beta_{p-1} X_{i,p-1} \quad (2)$$

where $\beta_0, \beta_1, \ldots \beta_{p-1}$ are the weights (regression parameters), $X_{i1}, X_{i2}, \ldots X_{i,p-1}$ are expressions incorporating the element ratios ($f_1, f_2, \ldots f_4$ in the weighting expression), $i=1 \ldots n$ with n being the number of dosimeters incorporated in the training set, and $Y_i$ is the value of the dose calibration (r) for dosimeter i.

For each dosimeter, there is given an experimental value for the element ratios (or related quantities) and the value of the dose assigned by the calibration laboratory. Then, the values of the weighting factors (parameters) are calculated so that Expression (2) most closely approximates the data.

The solution may be based on finding the values of the regression parameters using the method of least squares. The deviation of the measured $Y_i$ from its calculated value is considered. The sum of the n squared deviations is denoted by Q as follows:

$$Q = \Sigma(Y_i - \beta_0 - \beta_1 Y_{i1} - \beta_2 X_{i2} - \ldots - \beta_{p-1} X_{i,p-1})^2$$

The best estimate of the regression parameters ($\beta_i$) are those values that minimize Q for a given training set.

The solution is obtained by solving the following set of p linear equations:

$$\delta Q/\delta \beta_j = 0; \, j=0 \ldots (p-1)$$

The solution is given in matrix form by the following expression:

$$\beta = (X^t X)^{-1} X^t Y$$

where $$Y = \begin{Bmatrix} Y_1 \\ Y_2 \\ \cdot \\ \cdot \\ \cdot \\ Y_n \end{Bmatrix}$$

$$\beta = \begin{Bmatrix} \beta_1 \\ \beta_2 \\ \cdot \\ \cdot \\ \cdot \\ \beta_{p-1} \end{Bmatrix}$$

$$X = \begin{Bmatrix} 1 & X_{11} & X_{12} & \ldots & X_{1,p-1} \\ 1 & X_{21} & X_{22} & \ldots & X_{2,p-1} \\ \cdot & \cdot & \cdot & \ldots & \cdot \\ 1 & X_{n1} & X_{n2} & \ldots & X_{n,p-1} \end{Bmatrix}$$

X' is the transpose matrix of X, i.e., the first column of X is the first row of X', the second column of X is the second row of X', and so on. $X^{-1}$ is the inverse of the matrix X, i.e., $XX^{-1}=1$, where 1 is the unity matrix (i.e., all the diagonal elements are 1 and the rest are zero).

Using the above learning algorithm, the network was trained with approximately 200 dosimeters exposed to a variety of radiation types and compositions and the following weights were obtained for general (unknown beta fields), and point or slab geometry for the beta field.

| Weight | Deep (gen.) | Shallow (gen.) | Deep (point) | Shallow (point) | Deep (slab) | Shallow (slab) |
|---|---|---|---|---|---|---|
| $W_{11}$ | 1.046 | −0.354 | 0.705 | −0.262 | 0.084 | 0.470 |
| $W_{12}$ | 3.071 | −1.027 | 2.387 | −1.001 | 4.004 | 2.417 |
| $W_{13}$ | 0.267 | −5.408 | −0.204 | −4.342 | −0.315 | −5.104 |
| $W_{21}$ | 0.384 | 7.790 | 2.788 | 7.207 | 7.094 | −0.663 |
| $W_{22}$ | −8.729 | 1.763 | −6.598 | 1.523 | −15.167 | −0.825 |
| $W_{23}$ | −7.102 | 36.620 | −2.148 | 29.046 | 6.720 | 10.199 |
| $W_{31}$ | −2.268 | −15.226 | −6.933 | −13.709 | −14.46 | 2.299 |
| $W_{32}$ | 7.826 | −1.458 | 5.397 | −1.167 | 19.443 | −1.493 |
| $W_{33}$ | 19.928 | −84.377 | 6.306 | −66.039 | −43.807 | −13.46 |
| $W_{41}$ | 1.616 | 8.360 | 4.234 | 7.380 | 7.279 | −1.689 |
| $W_{42}$ | −2.261 | 0.337 | −1.383 | 0.223 | −7.384 | 0.921 |
| $W_{43}$ | −15.487 | 62.878 | −4.160 | 48.646 | 54.540 | 4.797 |
| C | 0.847 | 1.220 | 0.896 | 1.207 | 0.845 | 0.984 |

The trained neural network, one wherein the above coefficients have been determined, may be used to interpret the dosimeter outputs to obtain meaningful dose information, in this case deep and shallow dose for general, slab and point geometries. For each case, Expression (1) is used to obtain the correction factor for the respective dose output that is then applied to the appropriate element output to obtain an accurate measure of the respective characteristic of the radiation field. For example, the deep dose (general) correction factor is applied to the output of the dosimeter element at position 2 to obtain the deep dose (general), and the shallow dose (general) correction factor is applied to the output of the dosimeter element at position 3 to obtain the shallow dose (general), and so on.

Preferably, the inputs to the neural network are filtered by the processor to exclude any inputs that are outside the limits of the previous training. In the herein described exemplary case, this is accomplished by first testing the basic element ratios L1/L4, L3/L2 and L3/L1 and forcing these ratios to the limits of the training set. For example, if the ratio L1/L4 is less than the lower limit of the range of training inputs, its value is replaced by the lower limit. This prevents the network from becoming unstable due to extrapolation of the outputs based on new limits, while still permitting meaningful dose information to be obtained. For any inputs outside the limits of the training, the processor may output an appropriate warning that the input resides outside the training set limits and has been forced to the limits of the training set. Alternatively, the processor could just reject the dosimeter data, if desired.

A neural network according to the invention may be implemented on, for example, a SUN workstation or other suitable computing device, that may include commercially available neurocomputer accelerator boards.

The foregoing is just one example of a neural network architecture that may be used with a specific multi-element dosimeter to determine certain characteristics of a radiation field to which the dosimeter has been exposed. The fundamental concept of the invention of using a neural network to extract meaningful radiation dose information from a plurality of radiation sensitive elements may be otherwise implemented as will be readily appreciated by those of ordinary skill in the art. Although described above in relation to a specific TLD dosimeter, other types of the radiation sensitive elements may be used such as other TL dosimeter elements and radiation sensitive elements other than those based on TLD such as electronic dosimeters that use photodiodes as the radiation sensitive elements. More particularly, the neural network may be otherwise implemented as in a real time radiation monitoring device that may include an electronic dosimeter (such as described in U.S. Pat. Nos. 4,876,454, 5,055,691 and 5,059,801, which are hereby incorporated herein by reference) or other type of dosimeter that may monitor exposure to a radiation field and provide element outputs on a real time basis. Each electronic dosimeter element may be periodically sampled (read) in conventional manner by the processor and the element outputs supplied to the trained neural network to provide an output or outputs indicative of one or more characteristics of the radiation field that may then be displayed on a suitable display or otherwise outputted on a real time basis to provide real time radiation field monitoring. As may be desired, the output of the neural network may be used, for example, to issue an alarm (silent, audible, visual, etc.) through appropriate means to warn of a particular condition such as cumulative dose in one or more radiation categories exceeding a predetermined amount.

The invention may be applied to measure various characteristics of a radiation field such as deep dose (general, point, slab), shallow dose (general, point, slab), total eye dose, photon and beta components, neutron dose, radiation energies, etc. In each instance, an appropriate neural network architecture may be employed, which may be other than the above described architectures, as deemed appropriate and desirable.

Although the invention has been shown and described with respect to certain preferred embodiments, equivalent alterations and modifications will no doubt occur to others skilled in the art upon the reading and understanding of this specification. Moreover, while a particular feature of the invention has been described with respect to only one or less than all of the illustrated embodiments, such feature may be combined with one or more features of the other embodiments, as may be desired and advantageous for any given or particular application. The present invention includes all such equivalent alterations and modifications, and is limited only by the scope of the following claims.

What is claimed is:

1. A dosimetry method comprising the steps of:

using a plurality of radiation sensitive elements to monitor exposure to a radiation field composed of one or more types of radiation at one or more different energies;

reading the radiation sensitive elements after irradiation by the radiation field to obtain element outputs; and analyzing the element outputs to determine the radiation field to which the radiation sensitive elements have been exposed, said analyzing step including supplying the element outputs to a trained neural network computer apparatus to provide an output indicative of the radiation field.

2. A dosimetry method as set forth in claim 1, wherein said neural computer network is composed of at least two layers of nodes connected by a plurality of links each having associated therewith a weighting coefficient 3. A dosimetry method as set forth in claim 2, wherein the input elements are functionally linked to a succeeding layer of said neural network.

4. A dosimetry method as set forth in claim 2, wherein the input elements are functionally linked by logarithmic functions to a succeeding layer of said neural network.

5. A dosimetry method as set forth in claim 2, wherein said element outputs are supplied to said trained neural network as ratios of one another.

6. A dosimetry method as set forth in claim 1, wherein said output is a correction factor that may be applied to a selected one of said element outputs to obtain a value for a respective dose category.

7. A dosimetry method as set forth in claim 6, wherein the dose category is selected from the group consisting of deep dose, shallow dose, eye dose, and photon and beta components.

8. A dosimetry method as set forth in claim 1, further comprising the step of training the neural network by using a computer implemented learning algorithm supplied with a plurality of input-output pairs to obtain the weighting coefficients.

9. A dosimetry method as set forth in claim 8, including the step of testing the input to see if it is outside the limits of the set of the input-output pairs used to train the neural network.

10. A dosimetry method as set forth in claim 9, including the step of forcing an input outside the limits of the training set of input-output pairs to the limits of the training set.

11. A dosimetry method as set forth in claim 1, including the step of displaying the output indicative of the radiation field on a real-time basis.

12. An dosimetry system comprising plurality of radiation sensitive elements for monitoring exposure to a radiation field composed of one or more types of radiation at one or more different energies;

means for reading the radiation sensitive elements after irradiation by the radiation field to obtain element outputs; and means for analyzing the element outputs to determine the radiation field to which the radiation sensitive elements have been exposed, said means for analyzing step including a trained neural network computer apparatus to which the element outputs are applied as inputs to provide an output indicative of the radiation field.

13. A dosimetry system as set forth in claim 12, wherein said trained neural network computer apparatus is composed of at least two layers of nodes connected by a plurality of links each having associated therewith a weighting coefficient.

14. A dosimetry system as set forth in claim 13, wherein the input elements are functionally linked to a succeeding layer of said neural network.

15. A dosimetry system as set forth in claim 13, wherein the input elements are functionally linked by logarithmic functions to a succeeding layer of said neural network.

16. A dosimetry system as set forth in claim 13, including means for supplying said element outputs to said trained neural network as ratios of one another.

17. A dosimetry system as set forth in claim 12, wherein said output is a correction factor, and means for applying the correction factor to a selected one of said element outputs to obtain a value for a respective dose category.

18. A dosimetry system as set forth in claim 17, further comprising output means for displaying said value.

19. A dosimetry system as set forth in claim 18, wherein the dose category is selected from the group consisting of deep dose, shallow dose, total eye dose, and photon and beta components.

20. A dosimetry system as set forth in claim 12, wherein said neural network computer apparatus was trained by using a computer implemented learning algorithm supplied with a plurality of input-output pairs to obtain the weighting coefficients.

21. A dosimetry system as set forth in claim 12, wherein the output indicative of the radiation field is displayed on a real-time basis.

22. A method of developing a dosimetry system for extracting radiation field information from a plurality of radiation sensitive elements used to monitor exposure to a radiation field composed of one or more types of radiation at one or more different energies, comprising the steps of:

determining an architecture for a neural computer network composed of at least two layers of nodes connected by a plurality of links each having associated therewith a weighting coefficient, and training the neural network by using a computer implemented learning algorithm supplied with a plurality of input-output pairs derived from processing radiation sensitive elements to obtain the weighting coefficients.

23. A method as set forth in claim 22, wherein the training step includes using back propagation.

* * * * *